3,174,485
ORGANOLEPTICALLY IMPROVED
TOBACCO PRODUCT
Robert B. Griffith, Robert R. Johnson, and Alton D. Quinn, Louisville, Ky., assignors to Brown & Williamson Tobacco Corporation, Louisville, Ky., a corporation of Delaware
No Drawing. Filed May 23, 1963, Ser. No. 282,592
10 Claims. (Cl. 131—17)

This invention relates to an organoleptically improved tobacco product, additives for such products and methods of making the same.

The desired natural tobacco flavor is generally obtained in smoking tobacco products by carefully selecting and blending tobacco leaf materials of the desired types and quality which have been cured in a prescribed manner. Other desirable organoleptic characteristics are imparted thereto by the addition of various casing and flavoring materials.

This procedure for obtaining the desired natural tobacco organoleptic characteristics presents a number of problems. Thus, it is desirable that a specified brand of cigarettes or other tobacco product always have the same natural tobacco flavor and aroma so that the consumer smoking that brand can rely on the uniform organoleptic characteristics thereof. Any variations in the organoleptic characteristics of any one or more of the component tobacco materials in the blend will result in variations in the taste and aroma of the cigarette or other tobacco product. In the growing of any plant product, such as tobacco, variations inevitably occur from crop to crop and field to field depending on many different factors, such as variations in soil conditions or in fertilizers, differences in rainfall, sunshine and temperature, and variations in genetic strains. Where attempts are made to compensate for differences in the natural characteristics of the tobacco components in the blend by varying the types of components or proportions in the blend, further problems arise due to individual human differences in taste and smell.

The problem is further complicated by variations and deterioration in the aroma and flavoring characteristics of certain types of tobacco in recent years.

Attempts to compensate for such variations in natural tobacco flavor and aroma characteristics by varying the casing and flavoring additives of the type heretofore employed might serve to mask or conceal such variations or to impart other flavoring characteristics thereto, but they would not serve to enhance and to make uniform the desired natural tobacco organoleptic characteristics.

It is a particular object of the present invention to provide an organoleptically improved smoking tobacco product and additives therefor, as well as methods of making the same which overcome the problems heretofore encountered and in which the desired natural flavoring characteristics of tobacco are enhanced and may be readily controlled and maintained at the desired uniform level regardless of variations in the tobacco components of the blend.

A further object is the provision of improved tobacco additives and methods whereby various desirable flavoring characteristics may be imparted to smoking tobacco prodcuts and may be readily varied and controlled to produce the desired uniform flavoring characteristics.

Other objects include the provision of improved new compositions of matter which may be used as tobacco additives to enhance the flavor and aroma thereof and also to improved methods of making such compositions.

In carrying out our invention we add to smoking tobacco material an aroma and flavor additive containing as active ingredients one or more of the following materials:

(1) 2-methyl-5-isopropyl-1,3-nonadiene-8-one, either d,l, or racemic.
(2) The precursor for the foregoing active ingredient having the characteristics as herein defined.
(3) 2,6 - dimethyl-2,6-undecadiene-10-one (geranylacetone).
(4) 2-methyl-5-isopropylacetophenone or its isomers such as 2-methyl-4-isopropylacetophenone.
(5) p-Methylacetophenone.
(6) 6-methyl-5-hepten-2-one (methylheptenone).
(7) Methyl-2-furoate.

We prefer to employ an aroma and flavoring additive containing as active ingredients (1) 2-methyl-5-ispropyl-1,3-nonadiene-8-one either optically active or racemic and/or active ingredient (2) the precursor for the foregoing active ingredient either alone or blended with any one or more of the other active ingredients listed above. However, any one of the other, active ingredients listed above may be used either alone or blended with one or more of the other active ingredients.

In addition to the above ingredients other flavoring and aroma additives may be added to the smoking tobacco material, either separately or in mixture with the above listed active ingredients.

An aroma and flavoring concentrate containing one or more of our above indicated flavoring additives as active ingredients may be added to the smoking tobacco material, to the filter or to the leaf or paper wrapper. The smoking tobacco material may be shredded, cured, cased and blended tobacco material or reconstituted tobacco material or mixtures thereof. The proportions of the flavoring additives may be varied in accordance with taste, but we have found that satisfactory results are obtained if the proportion by weight of each of the active ingredients to smoking tobacco material is between 0.001 and 1.0% of the active ingredients to the smoking tobacco material.

Any convenient method for incorporating our improved additives in the tobacco product may be employed. Thus, the active ingredients may be dissolved in a suitable solvent such as ethanol, pentane, ether and other volatile organic solvents, and either sprayed on the cured, cased and blended tobacco material or the tobacco material dipped therein. Under certain circumstances, a solution of the active ingredients may be applied by a suitable applicator such as a brush or roller on the paper or leaf wrapper for the smoking product, or it may be applied to the filter by spraying, dipping or coating.

The following is a specific example of a method of preparing aroma flavoring materials from which certain of the active ingredients can be made:

*Example 1*

A vacuum flask containing 1 kg. of tobacco is connected to a receiver flask for collecting the volatile constituents distilled from the tobacco. A vacuum source is connected to the receiver flask through a trap immersed in liquid nitrogen. The vacuum flask is provided with a heating means, such as may be obtained from electrically heated mantles fitted around the exterior of the flask.

The tobacco is subjected to a temperature of approximately 150° C. under an absolute pressure of 0.1 mm. Hg for eight hours. Since the entire system is under extreme reduced pressure, any volatile matter released from the tobacco is immediately removed from the vacuum flask and transferred to the volatile receiver flask. The transfer of high boiling materials is faciltated by the sweeping effect of water which is continuously being released from the tobacco. In this connection, the volatiles are removed at ambient temperatures even though the volatiles have been liberated at pyrolytic temperatures from the tobacco itself. Also, to insure that all of the volatile constituents from the tobacco are collected the volatile receiver flask is immersed in a Dry Ice and acetone bath which lowers the temperature thereof to approximately −78° C., thus, the volatiles as they are removed from the tobacco are rapidly condensed in the receiver flask with substantially no loss of the volatile aroma constituents. After all of the volatiles are removed from the tobacco the vacuum is released and the receiver flask is allowed to adjust to ambient temperature so that the crude distillate may be prepared for separation into its component parts.

Preparatory to isolating the individual aroma constituents of the crude distillate a light hydrocarbon solvent, such as pentane, is added to the receiver flask and agitated so that the hydrocarbon soluble fraction of the crude distillate is dissolved in the hydrocarbon solvent and thereafter separated from the hydrocarbon insoluble portion. To the hydrocarbon soluble fraction is added, in successive washings, aqueous solutions of 10% sodium carbonate and 10% acetic acid solutions. Each aqueous solution is separated from the hydrocarbon solvent fraction by usual liquid-liquid separatory means. The hydrocarbon solvent is removed at ambient temperatures under a moderate vacuum to leave a neutral distillate fraction. This fraction, when obtained from low temperature distillations, is characterized by a powerful tobacco aroma and hereinafter will be designated as the aroma concentrate. The aroma concentrate is a complex mixture of volatile compounds which has distinctive organoleptic properties usually associated with tobacco. These compounds cover a wide range of polarity and volatility.

*Example 2*

The following is an example of a specific procedure for isolating active ingredient (1) L-(+)-2-methyl-5-isopropyl-1,3-nonadiene-8-one from the above-referred aroma concentrate.

The aroma concentrate is separated into a number of fractions by solid-liquid chromatography on a silica gel column. The column (3.6 x 35.6 cm.) is prepared by slurrying silica gel in ether and filling the column therewith. The ether is displaced by hexane, then 14 gms. of aroma concentrate is applied to the column in hexane. Elution is accomplished with 500 cc. of hexane, followed by 1500 cc. of 10% ether-90% hexane (v./v.). After 400 cc. of the ether-hexane eluant has passed through the column 1000 cc. is collected. The eluant collected contains as a major constituent 2-methyl-5-isopropyl-1,3-nonadiene-8-one. The resulting crude fraction hereinafter referred to as the aroma complex, contains 2-methyl-5-isopropyl-1,3-nonadiene-8-one in greatest yield and varying amounts of 2,6-dimethyl-2,6-undecadiene-10-one, 2-methyl-5-isopropylacetophenone and other minor constituents. When the aroma complex was incorporated in tobacco products, it was found to enhance the natural tobacco aroma characteristics and when smoked greatly improved the organoleptic qualities of the smoke. Although the amounts of this aroma complex added to a tobacco product was deminimus with respect to the total weight of the tobacco product, the above-referred properties were greatly enhanced.

The succeeding 500 cc. of ether hexane eluted from the column contains compounds p-methylacetophone, methyl-2-furoate and 6-methyl-5-hepten-2-one. Thus, the aroma concentrate is subdivided into smaller and less complicated fractions. The composition of each fraction from the silica gel chromatography is determined by gas-liquid chromatography analysis.

Further separation and purification of the fractions thus obtained from the solid-liquid chromatographic procedure are accomplished by preparative gas-liquid chromatography (GLC).

Those fractions from silica gel chromatography which are shown by analytical GLC contain 2-methyl-5-isopropyl-1,3-nonadiene-8-one are separated by preparative GLC with 0.05 cc. injections being used. Separation is accomplished on a 20' x ¼" column containing 20% diethyleneglycol succinate (DEGS) on 40/60 mesh Chromosorb-P at a temperature of approximately 180° C., and a helium inlet pressure of 30 p.s.i.g. Substantially pure 2-methyl-5-isopropyl-1,3-nonadiene-8-one is eluted and collected from 14.4 to 17.3 minutes after sample injection. Less pure (3) 2,6-dimethyl-2,6-undecadiene-10-one and (4) 2-methyl-5-isopropylacetophenone are eluted and collected from the same samples at 19.6 to 24.2 minutes and 27 to 29.5 minutes respectively after sample injection. Thus, by passing each appropriate fraction through the GLC apparatus 2-methyl-5-isopropyl-1,3-nonadiene-8-one is separated therefrom, collected and mixed together to form one fraction. It is purified by dissolving the collected fractions in pure pentane and extracting the mixture with successive portions of water, 10% aqueous sodium carbonate, two portions of 1-1-methanol-water and finally with one portion of water. The pentane is removed under a mild vacuum and the residue distilled in an all glass apparatus at a pressure of 0.10 mm. Hg to yield pure (1) L-(+)-2-methyl-5-isopropyl-1,3,-nonadiene-8-one. The physical properties found are: boiling point=50° C./O. 1 mm.; refractive index $(n_D^{20}=1.4755)$; observed rotation $(\alpha_D^{23})=+11.88°$; specific rotation $([\alpha]_D^{23})=+13.44°$; molecular refraction $(M_D)=61.94$ for $C_{13}H_{22}O$. Elemental analysis of (1) L-(+)-2-methyl-5-isopropyl - 1,3 - nonadiene-8-one found C, 80.45%; H, 11.07%; O, 8.48% calculated for $C_{13}H_{22}O$, C, 80.35%; H, 11.41%; O, 8.24%.

It should be understood that the active ingredients, 2,6-dimethyl-2,6-undecadiene-10-one and 2-methyl-5-isopropylacetophenone may be collected and purified as described in Example 2 for the purification of 2-methyl-5-isopropyl-1,3-nonadiene-8-one. However, 2,6-dimethyl-2,6-undecadiene-10-one may be more advantageously prepared by following the procedure of M. F. Carroll described in his publication in Journal of the Chemical Society, pages 507–511 (1941). Also, compound 2-methyl-5-isopropylaretophenone or its isomer, may be prepared by the procedure of D. V. Nightingale and J. M. Shackelford published in the Journal of the American Chemical Society, volume 78, pages 133–135 (1956). Compounds 5, 6 and 7 listed in column—infra are commercially available, thus the compounds numbered 3–7 and listed in column—are either commercially available or may be prepared synthetically.

*Example 3*

The following is an example of a specific procedure for preparing active ingredient (2) the precursor of 2-methyl-5-isopropyl-1,3-nonadiene-8-one. The precursor is assayed by gas chromatography using an injector block which is maintained at approximately 240° C. At this temperature, the precursor is substantially instantaneously converted into the free aroma constituent, 2-methyl-5-isopropyl-1,3-nonadiene-8-one. Thus, on GLC analysis, the precursor gives a peak with the same retention time as that of the free aroma constituent. One kg. of burley tobacco is placed in a high speed mixer with 1.5 liters of chloroform. The resulting slurry is vacuum filtered after one minute of mixing. Two more extractions are made on the residue using 1 liter of fresh chloroform for each extraction. The three filtrates are combined and concentrated at 20°/10 mm. to 2 liters. The concentrate is extracted three times with 200 ml. of 5% sodium bicarbonate solution. The combined bicarbonate fractions are adjusted to a pH of 3.0 with 50% HCl and then it is extracted three times with 200 ml. of chloroform. The chloroform is striped using a mild vacuum to yield 0.466 gm. of crude precursor of 2-methyl-5-isopropyl-1,3-nonadiene-8-one hereinafter referred to as Residue A.

Residue A is mixed with several grams of silica gel prior to column chromotography. The column (22 x 60 mm.) is prepared by slurrying 100–200 mesh silica gel in ether and filling it to a height of 40 mm. The ether is displaced with 30% ether-70% heptane, thereafter, Residue A is added to the column. Elution is accomplished using the following solvent series:

| | | Cc. |
|---|---|---|
| 30% ether | 70% heptane | 200 |
| 60% ether | 40% heptane | 200 |
| 80% ether | 20% heptane | 100 |
| 100% ether | | 200 |
| 10% methanol | 90% ether | 200 |
| 20% methanol | 80% ether | 200 |
| 50% methanol | 50% ether | 100 |
| 100% methanol | | 100 |

The precursor of 2-methyl-5-isopropyl-1,3-nonadiene-8-one is eluted by the 100% ether and 10% methanol-90% ether solvent series. Ten ml. fractions are collected using an automatic fraction collector and are assayed, those found to have precursor of 2-methyl-5-isopropyl-1,3-nonadiene-8-one are combined and stripped of solvent at 20°/100 mm. to yield 0.237 gm. of (Residue B) of precursor fraction.

Residue B is dissolved in ether and added to a 100 tube countercurrent distribution (CCD) apparatus. The partitioning is performed using a solvent extraction system of 1 M phosphate buffer at a pH of 6.9 versus ether. After 100 transfers, the tubes are assayed for precursor and the contents of tubes (41–65) containing precursor are transferred to a separatory funnel and the phases separated. The phosphate buffer phase is acidified to a pH of 3.0 with 50% HCl and extracted four times with ether. The ether extracted phase is combined with the ether upper phase and the solvent is removed using a mild vacuum to yield 0.154 gm. (Residue C) of precursor.

Residue C is placed in a CCD apparatus and the same procedure is followed as previously described to yield substantially pure Residue C'. Residue C' is dissolved in 95% ethanol and any precipitate formed is discarded. The ethanol is removed at 20° C.-1 micron to yield 0.068 gm. of substantially pure precursor of 2-methyl-5-isopropyl-1,3-nonadiene-8-one which is a clear yellow, viscous liquid. Due to its apparently complex structure other physical characteristics are not available to date. However, when this active ingredient is incorporated into a tobacco product, even in de minimus proportions when compared to the weight of tobacco product used, it is found to enhance the organoleptic qualities of the tobacco product when smoked.

*Example 4*

The following is an example of a specific procedure for synthesizing (1)D-( − )-2-methyl-5-isopropyl-1,3-nonadiene-8-one.

The starting material used for the synthetic preparation of D-(−)-2-methyl-5-isopropyl-1,3-nonadiene-8-one is D(−)-3-isopropyl-6-ketoheptanal. It is prepared as described by Y. Kishida (Chemistry and Industry, 465–466 (1960)). One equivalent of isopropenyl magnesium bromide in tetrahydrofuran is added slowly to a well stirred solution of D-(−)-3-isopropyl-6-ketoheptanal with the reaction temperature being maintained at approximately −20° C. or less. After the addition is complete the complex is decomposed with a saturated solution of ammonium chloride in concentrated aqueous ammonia. The aqueous layer is extracted with fresh ether and the combined organic layers are washed with a small amount of water and then with saturated sodium chloride solution. After drying over magnesium sulfate, the solution is filtered and concentrated at 30° C./20 mm. to give a crude residue containing 2-methyl-3-hydroxy-5-isopropyl-1-nonene-8-one. This residue is disolved in 75 cc. of dry pyridine and then slowly added to a stirred solution of phosphorus oxychloride (25 g. in 80 cc. dry pyridine) at a rate such that the reaction temperature remains at 10° C. or less. The resulting solution is stirred at ambient temperature for eight hours and then it is poured into a mixture of ice and water and extracted with pentane. The pentane fraction is extracted with successive portions of water, 3 N hydrochloric acid, water and 10% aqueous sodium carbonate. The pentane is removed at 20° C./20 mm. Thereafter, the residue is distilled at 20–120° C./0.1 mm. to yield crude D-(−)-2-methyl-5-isopropyl-1,3-nonadiene-8-one. The crude product is purified by preparative GLC using 10' x ⅜" 30% SE–30 on 40/60 mesh Chromosorb-P column with a helium inlet pressure of 30 p.s.i.g. and a column temperature of 185° C. D-(−)-2-methyl-5-isopropyl-1,3-nonadiene-8-one is eluted at 14.3 minutes after sample injection and is collected in approximately 5% yield from the crude product. Pure D-(−)-2-methyl-5-isopropyl-1,3-nonadiene-8-one is an almost colorless, mobile liquid with a mild aroma usually associated with tobacco. It is identical in all respects, except for the optical rotation, with (1) L-(+)-2-methyl-5-isopropyl-1,3-nonadiene-8-one isolated from tobacco as described in Example 1.

It was determined that the D-2-(−)-3-isopropyl-6-ketoheptanal was not optically pure, that it was found that the final product of the above described synthesis yielded d,l and racemic 2-methyl-5-isopropyl-1,3-nonadiene-8-one.

As previously indicated, any convenient method for incorporating our additives in a tobacco product may be employed. Thus, the additives may be dissolved in a suitable solvent and either sprayed on the cured, cased and blended tobacco or the tobacco dipped therein. Also, our additives may be applied by a suitable applicator such as a brush, or a roller on the paper or leaf wrapper, or filter of a smoking product.

Specific examples of methods of incorporating our flavor and aroma materials in a tobacco product are as follows:

*Example 5*

Approximately 100 mg. of L-(+)-2-methyl-5-isopropyl-1,3-nonadiene-8-one is dissolved in 100 cc. of absolute ethanol and sprayed on approximately 1 kg. of cured, cased and blended commercial tobacco. The tobacco so treated was made into cigarettes.

*Example 6*

Approximately 50 mg. of the aroma complex which contains a major proportion of active ingredient 2-methyl-5-isopropyl-1,3-nonadiene-8-one and varying minor proportions of active ingredients 2,6-dimethyl-2,6-undecadiene-10-one, 2-methyl-5-isopropylacetophenone and other constituents is dissolved in 100 cc. of absolute ethanol and sprayed on cured, cased and blended commercial tobacco. The tobacco so treated was made into cigarettes. Also, cigaretes were made using 25 and 100 mg. of aroma complex per kg. of tobacco.

*Example 7*

Approximately 100 mg. of the aroma concentrate which contains a major proportion of active ingredient 2-methyl-5-isopropyl-1,3-nonadiene-8-one and varying minor proportions of active ingredients 2,6-dimethyl-2,6-undecadiene-10-one, 2-methyl-5-isopropylacetophenone, p-methylacetophenone, methyl-2-furoate, 6-methyl-5-hepten-2-one and other constituents is disoslved in 100 cc. of absolute ethanol and sprayed on cured, cased and blended commercial tobacco. The tobacco so treated was made into cigarettes.

*Example 8*

Approximately 50 mg. of active ingredient (2) the precursor of 2-methyl-5-isopropyl-1,3-nonadiene-8 - one is dissolved in 100 cc. of absolute ethanol and sprayed on cured, cased and blended commercial tobacco. The tobacco so treated was made into cigarettes.

Example 9

Approximately 100 mg. of an equally proportioned mixture of active ingredients 2-methyl-5-isopropyl-1,3-nonadiene-8-one, 2,6-dimethyl-2,6-undecadiene-10-one, 2-methyl-5-isopropylacetophenone, 2-methyl-4 - isopropylacetophenone, p-methylacetophenone, methyl-2 - furoate, 6-methyl-5-hepten-2-one is dissolved in 100 cc. of absolute ethanol and sprayed on cured, cased and blended commercial tobacco. The tobacco so treated is made into cigarettes Employing the procedure as described in Example 9, any one of our flavor and aroma additives or mixtures thereof may be used and incorporated in a tobacco product.

The tobacco products made in accordance with the specific examples have been smoked, evaluated and tested organoleptically; the smoking products were found to enhance the flavor and aroma of the tobacco product. Additionally, the flavor was noted to have a highly pleasing quality which lacked the harshness generally associated with tobacco smoke.

Modifications may be made in the described embodiments of our invention without departing from the scope of the invention as set forth in the accompanying claims.

We claim:

1. An organoleptically improved smoking tobacco product comprising smoking tobacco material encased in a wrapper and a flavor and aroma additive applied to said product which includes as an active ingredient material selected from the group consisting of 2-methyl-5-isopropyl-1,3-nonadiene-8-one; the precursor of said 2-methyl-5-isopropyl-1,3-nonadiene-8-one; 2 6-dimethyl-2,6 - undecadiene-10-one; 2-methyl - 5 - isopropylacetophenone; p-methylacetophenone; 2-methyl-4-isopropylacetophenone; 6-methyl-5-hepten-2-one; methyl-2-furoate; each of said active ingredients used comprising between 0.001 and 1.0% by weight of the smoking tobacco material.

2. An organoleptically improved smoking tobacco product as set forth in claim 1 wherein said active ingredient is 2-methyl-5-isopropyl-1,3-nonadiene-8-one.

3. An organoleptically improved smoking tobacco product as set forth in claim 1 wherein said active ingredient is 2,6-dimethyl-2,6-undecadiene-10-one.

4. An organoleptically improved smoking tobacco product as set forth in claim 1 wherein said active ingredient is 2-methyl-5-isopropylacetophenone.

5. An organoleptically improved smoking tobacco product as set forth in claim 1 wherein said active ingredient is p-methylacetophenone.

6. An organoleptically improved smoking tobacco product as set forth in claim 1 wherein said active ingredient is 2-methyl-4-isopropylacetophenone.

7. An organoleptically improved smoking tobacco product as set forth in claim 1 wherein said active ingredient is 6-methyl-5-hepten-2-one.

8. A organoleptically improved smoking tobacco product as set forth in claim 1 wherein said active ingredient is methyl-2-furoate.

9. An organoleptically improved smoking tobacco product as set forth in claim 1 which includes as the active ingredient material the aroma complex which comprises 2-methyl-5-isopropyl-1,3-nonadiene-8-one, 2,6-dimethyl-2,6-undecadiene-10-one, 2-methyl-5 - isopropylacetophenone; each of said active ingredient comprising between 0.001 and 1.0% by weight of the smoking tobacco material.

10. An organoleptically improved smoking tobacco product as set forth in claim 1 which includes as the active ingredient material the aroma concentrate which comprises 2-methyl-5-isopropyl-1,3-nonadiene-8-one, 2,6-dimethyl-2,6-undecadiene-10-one, 2-methyl-5-isopropylacetophenone, p-methylacetophenone, methyl-2-furoate, 6-methyl-5-hepten-2-one; each of said active ingredient comprising between 0.001 and 1.0% by weight of the smoking tobacco material.

References Cited by the Examiner

UNITED STATES PATENTS

| | | | |
|---|---|---|---|
| 2,806,882 | 9/57 | Surmatis et al. | 260—593 |
| 2,824,896 | 2/58 | Surmatis | 260—593 |
| 2,905,575 | 9/59 | Giles | 131—17 |
| 2,905,576 | 9/59 | Schumacher | 131—17 |

OTHER REFERENCES

Condensed Chemical Dictionary, published 1956 by Reinhold Publishing Corp., New York, pages 710, 719 and 720.

ABRAHAM G. STONE, *Primary Examiner.*

F. RAY CHAPPELL, *Examiner.*